US009584405B2

(12) United States Patent
Jenkins

(10) Patent No.: US 9,584,405 B2
(45) Date of Patent: Feb. 28, 2017

(54) APPLICATION LAYER SESSION ROUTING

(71) Applicant: BRITISH TELECOMMUNICATIONS PUBLIC LIMITED COMPANY, London (GB)

(72) Inventor: Ian William George Jenkins, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/430,571

(22) PCT Filed: Sep. 26, 2013

(86) PCT No.: PCT/GB2013/000404
§ 371 (c)(1),
(2) Date: Mar. 24, 2015

(87) PCT Pub. No.: WO2014/049316
PCT Pub. Date: Apr. 3, 2014

(65) Prior Publication Data
US 2015/0229562 A1 Aug. 13, 2015

(30) Foreign Application Priority Data
Sep. 27, 2012 (EP) .................................... 12250156

(51) Int. Cl.
*H04L 12/725* (2013.01)
*H04L 12/707* (2013.01)
(Continued)

(52) U.S. Cl.
CPC ...... *H04L 45/3065* (2013.01); *H04L 41/0659* (2013.01); *H04L 41/0686* (2013.01);
(Continued)

(58) Field of Classification Search
CPC ... H04L 45/306; H04L 45/64; H04L 65/1046; H04L 65/1069; H04L 45/3065;
(Continued)

(56) References Cited

U.S. PATENT DOCUMENTS 7,453,803 B1   11/2008 Bugenhagen
9,300,696 B2 *  3/2016 Kim .................... H04L 65/1069
(Continued)

FOREIGN PATENT DOCUMENTS

CN   101102265 A   1/2008
EP   2 096 794     9/2009
(Continued)

OTHER PUBLICATIONS

Tavakoli, Arsalan, "Exploring a Centralized/Distributed Hybrid Routing Protocol for Low Power Wireless Networks and Large-Scale Datacenters," pp. 1-105, A Dissertation Submitted in Partial Satisfaction of the Requirements for the Degree of Doctor of Philosophy in Computer Science in the Graduate Division of the University of California, Berkeley, Fall 2009.
(Continued)

*Primary Examiner* — Brian D Nguyen
(74) *Attorney, Agent, or Firm* — Nixon & Vanderhye PC

(57) ABSTRACT

A method and server system for providing application layer session routing based on network element availability. A server system (12, 18) is arranged to monitor the abilities of session control edge nodes (21A-D) within a large VoIP and Multimedia transit network (20) to handle session set-up requests. A status module (38) in the server system receives status messages (22, 24) from the edge nodes and based on these messages a selection and modification module (40, 41) selects which edge nodes (21A-D) as well as which of their
(Continued)

associated interconnects to other networks to include in a response (5) to a routing request (4) from a source node (21A-D).

14 Claims, 6 Drawing Sheets

(51) Int. Cl.
    *H04L 12/24*     (2006.01)
    *H04L 29/06*     (2006.01)
    *H04L 12/715*     (2013.01)

(52) U.S. Cl.
    CPC ............ H04L 45/22 (2013.01); H04L 45/306 (2013.01); H04L 45/64 (2013.01); H04L 65/1046 (2013.01); H04L 65/1069 (2013.01); H04L 65/80 (2013.01)

(58) Field of Classification Search
    CPC . H04L 41/0659; H04L 41/0686; H04L 45/22; H04L 65/80
    See application file for complete search history.

(56) References Cited

U.S. PATENT DOCUMENTS

| | | | |
|---|---|---|---|
| 2005/0254510 A1* | 11/2005 | Oja | ..................... H04L 65/1069 370/431 |
| 2006/0271811 A1 | 11/2006 | Horton et al. | |
| 2008/0002676 A1* | 1/2008 | Wiley | ............... H04L 29/06027 370/356 |
| 2008/0049776 A1 | 2/2008 | Wiley et al. | |
| 2008/0144605 A1 | 6/2008 | Qiu et al. | |
| 2008/0250156 A1 | 10/2008 | Agarwal et al. | |
| 2008/0304485 A1 | 12/2008 | Sinha et al. | |
| 2009/0172174 A1 | 7/2009 | Zha | |
| 2009/0193071 A1* | 7/2009 | Qiu | ..................... G06F 11/0709 709/203 |
| 2009/0307334 A1 | 12/2009 | Maltz et al. | |
| 2011/0040836 A1* | 2/2011 | Allen | .................. H04L 65/1093 709/205 |
| 2011/0058544 A1 | 3/2011 | Sardesai et al. | |
| 2012/0023530 A1* | 1/2012 | Xia | .................. H04N 21/23103 725/93 |

FOREIGN PATENT DOCUMENTS

| | | |
|---|---|---|
| EP | 2 209 283 | 7/2010 |
| GB | 2 380 894 | 4/2003 |
| WO | WO 2008/013649 | 1/2008 |

OTHER PUBLICATIONS

Doshi et al., "VoIP Network Architectures and QoS Strategy," pp. 41-59, Bell Labs Technical Journal, vol. 7, No. 4, 2003.
International Search Report for PCT/GB2013/000404 mailed Dec. 2, 2013, 3 pages.
International Preliminary Report on Patentability for PCT/GB2013/000404 mailed Oct. 2, 2014, 20 pages.

* cited by examiner

APPLICATION LAYER SESSION ROUTING

This application is the U.S. national phase of International Application No. PCT/GB2013/000404, filed 26 Sep. 2013, which designated the U.S. and claims priority to EP Patent Application No. 12250156.2, filed 27 Sep. 2012, the entire contents of each of which are hereby incorporated by reference.

FIELD OF INVENTION

The present invention relates to Voice over Internet Protocol (VoIP) and multimedia session routing and especially to a method and system for application layer session routing in transit networks between different service providers.

BACKGROUND OF INVENTION

Traditional voice networks usually have a hierarchy of switches that are used to route calls from one local exchange to another via transit and potentially international transit switches. Calls are passed from switch to switch, which each makes its own local routing decision based on the telephone number (end address) and also in part on the service state of the TDM link used to reach the next switch. If a link is busy, out of service or indeed if the switch is out of service, the proceeding switch uses alternate routes to bypass the nodes affected by a service congestion or equipment outage.

In networks implementing VoIP technology the call control and the media transport are separated into independent media and session control planes. With the advent of centralised routing servers that can be interrogated by the various network components the session control plane may have a non-hierarchical, flat architecture. For example, in closed networks, i.e. networks where one operator controls the ingress and egress of sessions within their network, the equipment dealing with session ingress or session origination can look up a destination address or telephone number via a central server to determine the primary destination equipment for session egress or session termination as well as a list of alternatives. An example of such a closed network is shown in FIG. 1. The network 8 comprises a number of session control nodes 10A-10D and a centralised routing policy server 12, which can be for example an enum server, a SIP redirect server or a DNS (Domain Name Service). A session setup is performed in several steps and will be explained in relation to FIG. 1. In step 1 an originating end user or originating network 14 sends a session setup request for destination address X to session control edge node 10A, where X may be a telephone number or a name. In step 2 the session control edge node 10 submits a routing request for address X to the centralised routing policy server 12. The server 12 stores a number of static routing policies and in step 3 it returns one or more routing alternatives to the source node 10A; for example $1^{st}$ Node 10C, $2^{nd}$ Node 10D. In step 4 the node 10A sends a session setup request to node 10C, the first alternative, and in step 5 the session control edge node 10C forwards the session setup request to the destination end user or destination network 16. In this network 8 there is not direct feedback to a source session control equipment 10A as to whether the destination session control equipment 10 B-D, which has been selected by the centralised routing policy function 12, is available to receive calls. It may have become isolated from the network through transmission faults or be out of service through equipment fault or planned maintenance and therefore unable to respond to any session setup signalling. A session setup message that is sent to such 'unreachable' destination equipment in the network will usually be retried a number of times by the source 10A before deciding to try any alternative route provided by the centralised routing policy function 12 or any local default routing policy. However, the elapsed time taken for this to happen can be such that the user 14 abandons the session set up before the source node 10A tries the alternate route. Even if the source node 10A learns to avoid the non-available destination equipment after a series of retries, it has no inherent mechanism to determine when the destination equipment is back in service.

To overcome this, VoIP and Multimedia session control functions 10A-D often send 'heartbeat' messages between each other so as to detect when its partner is unreachable and subsequently not available for service. Patent application EP2096794 discloses one such system where a monitored device sends service status information to a monitoring device via SIP messages according to instructions regularly received from the monitoring device. In SIP networks the OPTIONS message is often used between control nodes to bilaterally determine node status. However, bilateral heartbeat messages cause a problem as flat network architectures scale the number of session control nodes. If messages are exchanged bilaterally between n nodes every f seconds then the message rate is $(2*n*(n-1))/f = 2(n^2-n)/f$ per second. The factor '2' pertains to normal circumstances in which there is the same number of responses as there are heartbeat request messages. Therefore this message rate grows as a square of the nodes within a network, which on a large scale, such as a national or global network, can use significant node processing and network bandwidth, which may be costly and at a premium on remote international nodes. It also causes a significant management problem every time a node is added or permanently removed within the overall network as this network topology change has to be distributed to all other nodes.

Patent application WO2008013649 discloses a system which solves the problem of a call control manager (CCM) not having information about a bearer path within the domain that it controls. Without knowledge of the packet performance of the bearer path, the CCM may establish calls that result in poor voice quality or call setup failure. Therefore nodes in the network under the control of the CCM are configured to collect and communicate network packet performance information in the form of data packets via communication links to the CCM. Because the CCM communicates with multiple network nodes, the CCM may be configured to route calls based on the network performance information, such as available bandwidth, packet delay or packet loss, collected from the network nodes. If the characteristics of the IP path or terminating segment to a terminating trunk is impaired then the CCM can make a decision to use less bandwidth through codec choice or find an alternative terminating trunk with a different 'terminating segment' via a different path across the IP network. In the described architecture there is a direct and permanent signalling link between the CCM and a Media Gateway (MG). Hence, WO2008013649 assumes that the CCM controls, and is therefore aware of the status of, terminating trunks (Media Gateways) via direct signalling, which does not economically or practically scale into the very large VoIP networks being developed today both nationally and globally. Further, while WO2008013649 teaches that path performance data can be gathered by CCMs in different networks and shared between these networks, it is silent with respect of the signalling relationship between the session control peers, e.g. CCMs, and a CCM in one network would not know that a CCM in another network has failed.

SUMMARY OF INVENTION

According to a first aspect of the present invention there is provided a method for controlling session setup between session control edge nodes belonging to different service provider networks in a large scale VoIP transit network, said method comprising at a server system:

storing application layer routing policies indicating which destination session control edge nodes a source session control edge node can use in order to reach a destination network;

receiving status messages from each session control edge node;

receiving a routing request from one of said session control edge nodes;

selecting one or more of said application layer routing policies to include in a response to the requesting session control edge node based on said received status messages; and sending the selected routing policies to the requesting session control edge node.

This has the advantage that that the session routing is performed quicker and more efficiently since the centralised server will be aware of which control plane elements are available to use when routing a call. Thus, a session control edge node is not instructed to send a session setup request to an unavailable or faulty destination session control edge node in the transit network or out-of-service destination inter-connect to a destination network. A further advantage is that the number of status messages exchanged by the nodes is reduced to 2*n/f messages per second, resulting in reduction of processing and bandwidth overhead.

According to a second aspect of the invention there is provided a session control edge node of a first network that interfaces to a different network in a large scale application layer VoIP transit network, said edge node comprising a status signal generating module arranged in operation to send a status signal to a session control edge node status module arranged in a centralised server system in the application layer network.

By configuring the status signal generating module in the session control edge node to send status signals to a centralised server system the nodes can be dynamically discovered by the server, thus reducing the resources needed for management of the node data. In addition to its own status, the session control edge node may further signal the status of the availability status of individual connections to other networks that it serves.

According to a third aspect of the invention there is provided a server system for controlling session setup between session control edge nodes that interface to different networks in a large scale VoIP transit network, said server system comprising:

an interface arranged in operation to receive and to respond to routing requests from the session control edge nodes;

a policy store arranged to store application layer routing policies indicating which destination session control edge nodes a source session control edge node can use in order to reach a destination, network;

a policy selection module arranged in operation to select one or more of said application layer routing policies in response to a session routing request received from one of said session control edge nodes;

a session control edge node status module arranged in operation to receive-status messages from each session control edge node;

a store for storing said status messages;

wherein said policy selection module is further arranged in operation to select the application layer routing policies to include in a response to the requesting edge node based on said received status messages.

Embodiments of the invention will now be described, by way of example, with reference to the accompanying drawings in which:

DESCRIPTION OF PREFERRED EMBODIMENTS

Figure 1:
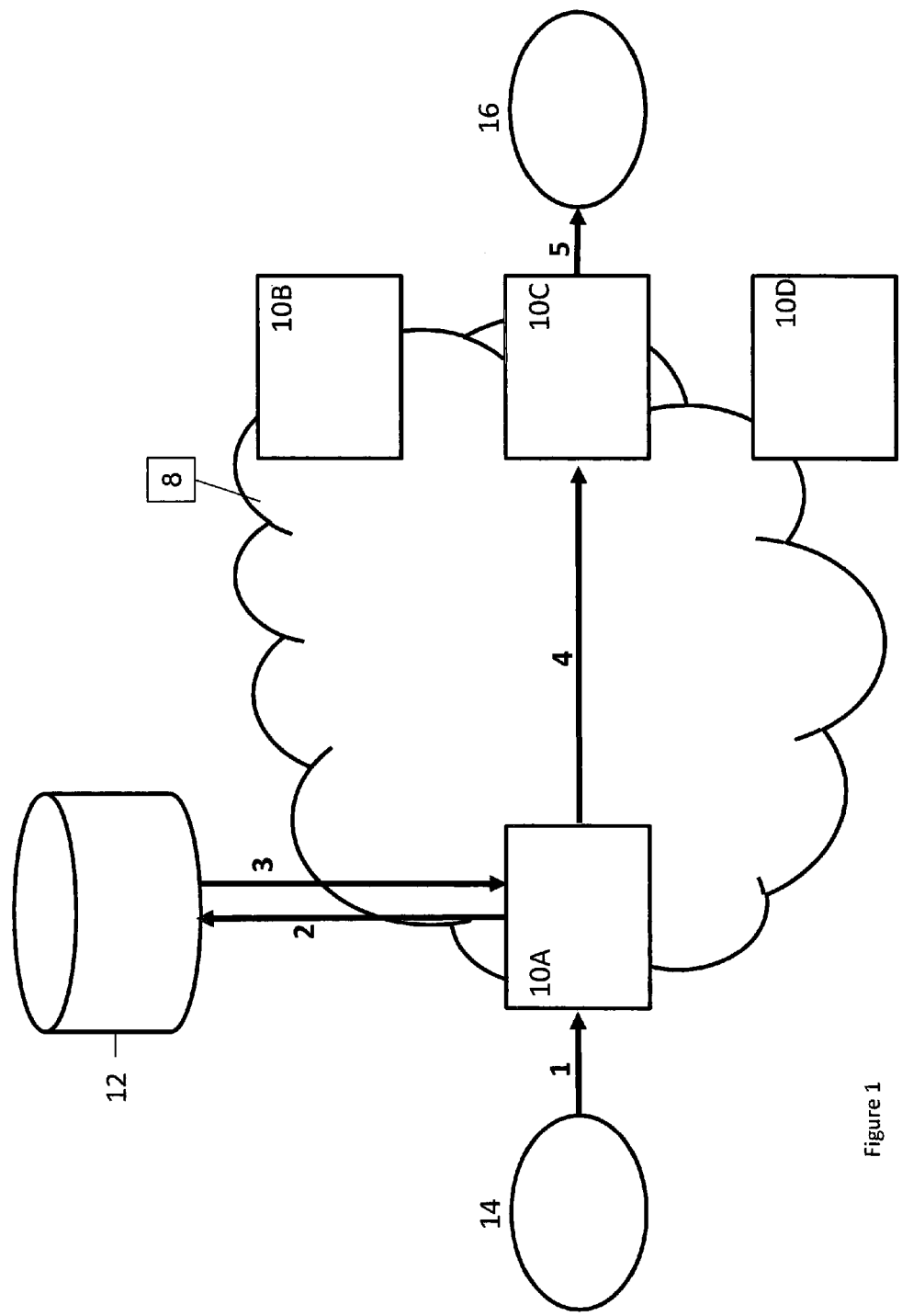
FIG. 1 shows a typical state of the art VoIP network with centralised routing and flat control plane architecture.
Figure 2:
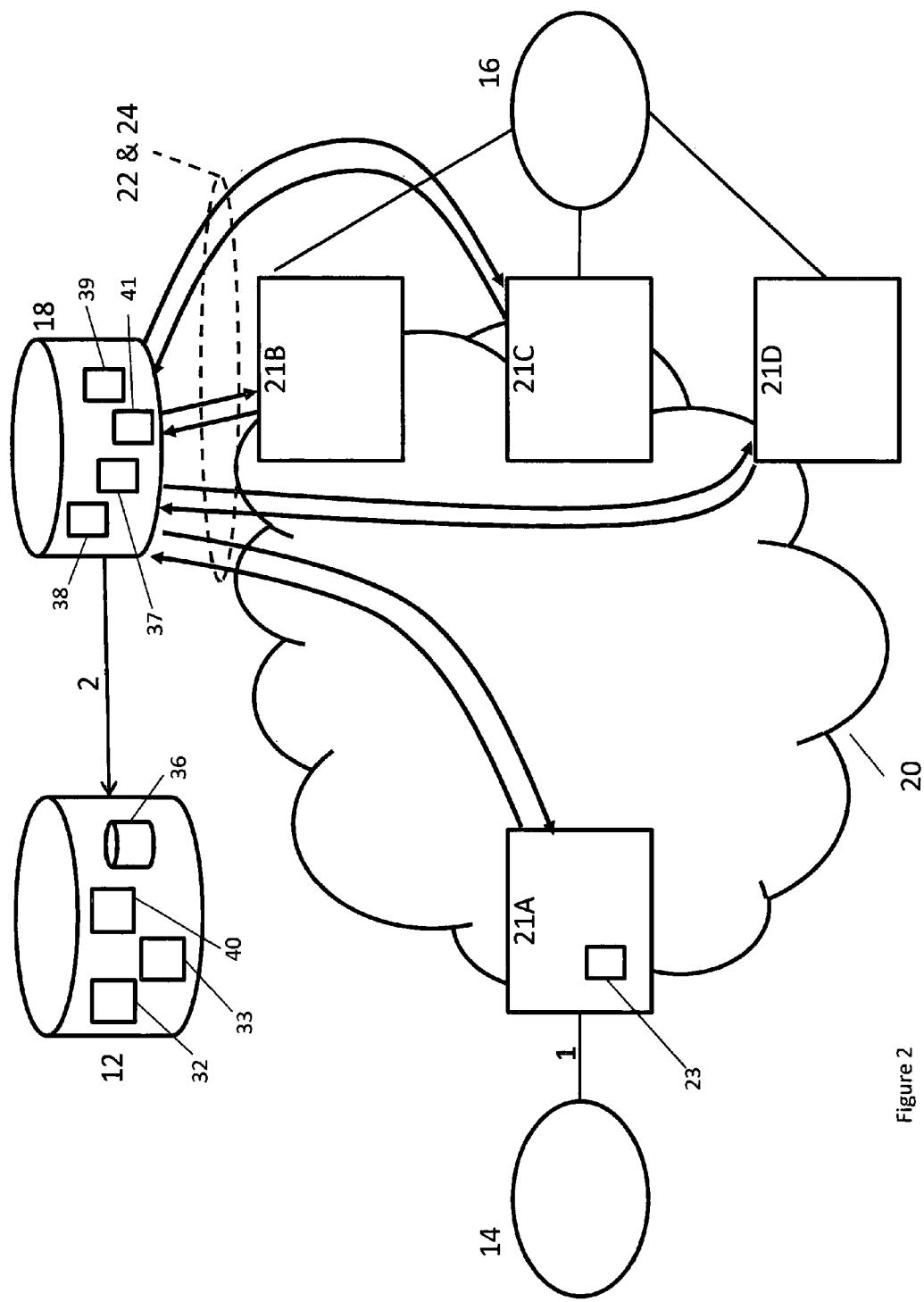
FIG. 2 shows a VoIP flat control plane architecture according to an embodiment of the present invention with centralised reachability server monitoring edge devices.

A first exemplary embodiment of the present invention will now be described in relation to FIG. 2. The Voice and multimedia network 20 of FIG. 2 is a large transit network where many different operators interconnect. The network 20 comprises a number of session control edge nodes 21A-D, which terminates the interconnection transmission to different operators, and a centralised routing policy server 12. The routing policy server 12 comprises a processor 32, a routing policy store 36, a selection and modification module 40, and one or more memories 33. The edge nodes 21 can be for example Session Border Controllers, Call Servers, Soft switches, Application servers, Application Gateways and Media Gateways controllers. In addition, there is a logical centralised reachability server 18 incorporated into the network. The centralised reachability server 18 comprises a processor 37, one or more memories 39 and a session control edge node status module 38 and for certain embodiments also a modification module 41.

When a new session control edge node 21 is added to the network 20 its identity, e.g. IP address or SIP URI, is added to the memory 39 of the centralised reachability server 18. The reachability server sends out a periodic heartbeat message to all configured edge nodes, including the new edge node, and awaits an acknowledgement.

Alternatively, the session control edge node can be configured with the address of the centralised reachability server 18, for example as a DNS fully qualified domain name (FQDN). The edge nodes 21A-D comprise a message generating module 23 (only one shown in the figure) arranged in operation to send a heartbeat message 22 to the session control edge node status module 38 in the reachability server 18, which stores the address of each edge node in the memory 39 as well as information about any interconnects associated with the edge node, and hence the reachability server dynamically learns about any new edge node. Upon receiving the status message the reachability server 18 responds by sending acknowledgments 24 to the edge node 21A-D.

In either case, each session control edge node 21A-D and the centralised reachability server 18 are configured to regularly exchange heartbeat messages 22, 24 with each other.

The reachability server 18 is configured to inform or update, 2, the routing policy server 12 of any changes with respect to the availability of session edge nodes 21A-D via a management interface, not shown in figure, for example when a session control edge node has failed to send, or respond to, one or more, messages. The routing policy server 12 stores in the store 36 routing policies stating which destination session control edge node 21A-D a source session control edge node 21A-D should preferable use in order to reach the destination network, or end user 16, as well as which alternative session control edge nodes to use and in which order. The routing policies are usually static but based on the information received from the reachability server 18 the policy selection and modification module 40 is configured to filter or to modify the routing policies to remove unavailable session control edge nodes 21A-D and/or one or more connections to a downstream network connection controlled by one of the session control edge nodes and not included in the status messages from said session control edge node. Once heartbeat messages are received again from the failed edge node the reachability server informs the policy server to reinstate the edge node as an option in its policy decisions.

If the centralised policy server 12 does not have the capability to filter or modify the routing policies the centralised reachability server 18 can act as a proxy for the routing requests and filter or modify the routing policies received from the policy server before forwarding them to the requesting session edge node 21A-D. In this alternative embodiment the selection module comprises a policy selection module at the policy server 12 and a modification module 41 at the reachability server 18.

Figure 5:
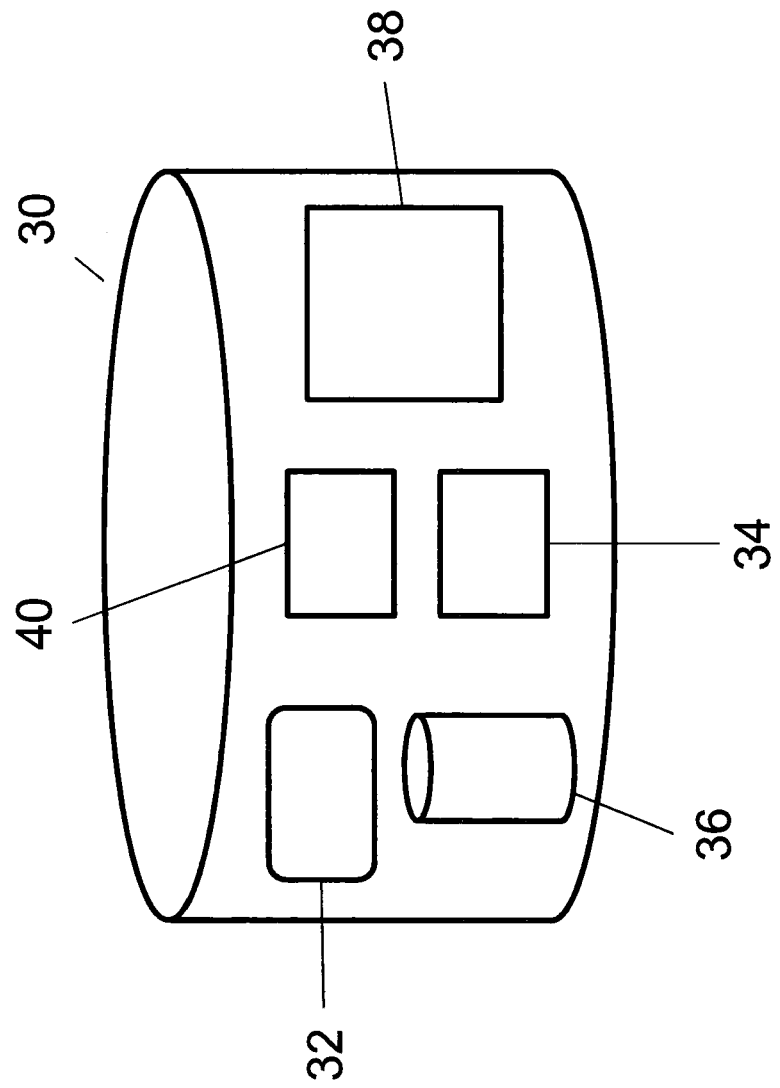
FIG. 5 shows a centralised server system according to one embodiment of the present invention.

In an alternative embodiment the functionality of the centralised reachability server and the centralised routing policy server are implemented in one, single, server 30. FIG. 5 shows such a server 30 comprising a processor 32, a memory 34, a store 36 for storing routing policies, a reachability heartbeat module 38 and a policy selection and modification module 40. The reachability module 38 and policy selection and modification module 40 are preferably implemented as program code which when loaded into the memory 34 and executed by the processor 32 performs the different steps for optimising the session routing in the application layer.

Figure 3:
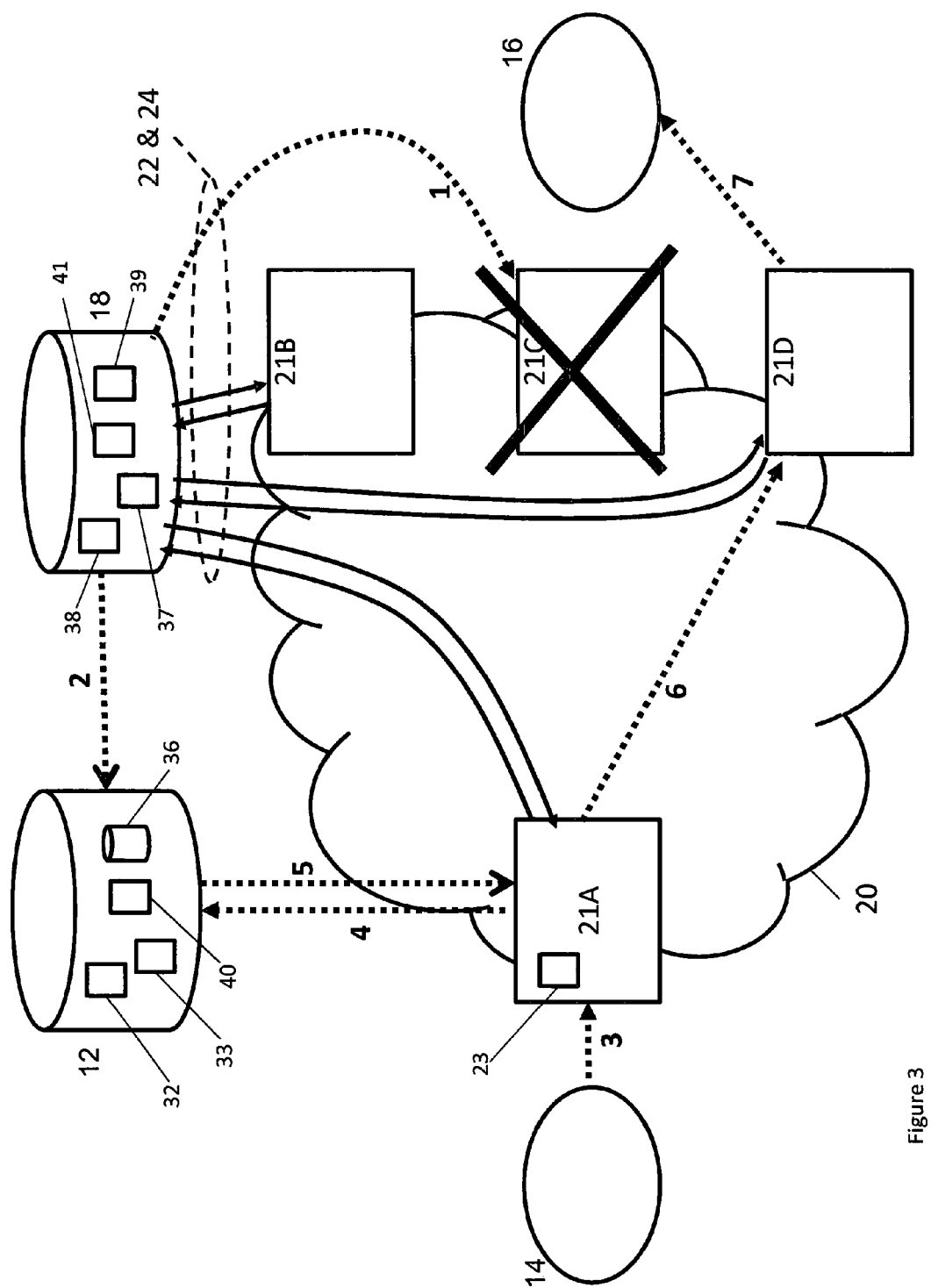
FIG. 3 shows a centralised reachability server modifying routing policies based on edge node availability according to an embodiment of the present invention.

With reference to FIG. 3 the different steps, indicated as dotted arrows 1-7 in the figure, leading to the selection of a destination session control node according to an embodiment of the invention is now described. The session control edge nodes 21A, B and D each respond to heartbeat messages 22 sent from the reachability server 18. Node 21C does however not respond to the heartbeat message, step 1. The reachability server builds and/or updates a stored in-service list, which lists session control edge nodes currently available for service. The reachability server 18 notifies the routing policy server 12 that session control edge node 21A,B,D are available for service. Alternatively, the reachability server could inform the policy server that the session control edge node 21C is unavailable, step 2. The policy server may store the information in the memory 33. A source network, or end user, 14 submits a request to session control edge node 21A for setting up a session to destination network or end user 16 having an address X, step 3. In step 4 the session control edge node 21A submits a routing request for address X to the routing policy server 12. The policy server 12 selects the appropriate routing policies but filters out, based on the information received from the reachability server 18, any of the policies that would direct the session control edge node 21A to route the session to session control node 21C, which has failed. The routing response is sent to the requesting session control edge node 21A, instructing the node 21A to route the session setup to destination session control edge node 21D as a first alternative and to route the session setup to session control edge node 21B as a second alternative, where the destination can also be reached either directly or indirectly by these nodes, step 5. The source session control edge node 21A sends a session setup request for address X to the destination session control edge node 21D, step 6, and the edge node 21D forwards the session setup request for address X to the destination network, or end user, 16, step 7.

Figure 4:
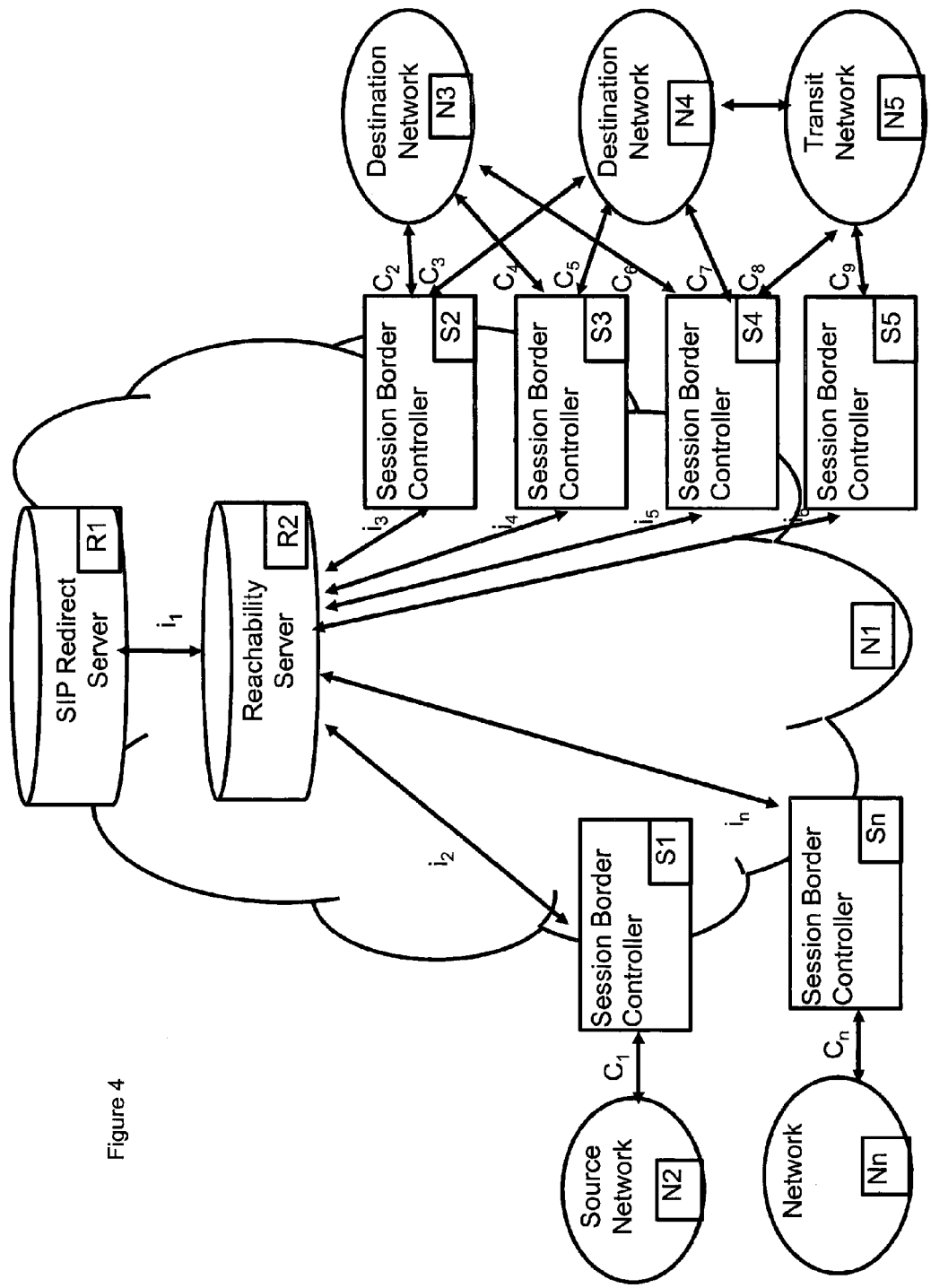
FIG. 4 shows an example implementation for an IP Transit network using SIP signalling.

A further example describing an alternative implementation for an IP transit network using SIP signalling is described in relation to FIG. 4. In this implementation the reachability server R2 acts as a SIP proxy for the real time routing requests to a SIP redirect server R1. This implementation also differs from the previous example in that the session control edge nodes which are the session border controllers S1-Sn initiate the heartbeats, which contain information on service status of the interconnecting SIP trunks to which they are connected. From this information the reachability server R2 dynamically builds the network's topology. Also, in this example, the reachability server R2 performs the function of modifying the responses to routing requests from the SIP redirect server R1 according to the service status of the interconnects, not just the session control edge nodes.

The following example uses the SIP signalling terminology and methods defined in IETF RFC 3261 and RFC 4904.

With reference to FIG. 4, this example shows an IP transit network (N1) using SIP signalling where the source and destination session control edge nodes are realised with Session Border Controllers (SBCs) designated ($S_1, S_2 \ldots S_n$) providing a SIP/IP interconnect service to Networks (N2, N3 ... $N_n$) via interconnects ($C_1, C_2, \ldots C_n$). It should be noted that this example is also applicable to networks where the source and destination session control edge nodes are realised by any hybrid mix or SBCs and Media Gateway Controllers with associated Media Gateways, such as are used to connect to TDM networks using SS7 signalling or IP networks with other signalling types such as Bearer Independent Call Control. Each SBC can have several interconnect connections to different networks and can send and receive calls from the attached networks. This example makes use of standard SIP universal resource indicator (URI) addressing that is resolved to one or more IP addresses using a Domain Name Service (DNS) server not shown. The SIP redirect server (R1) is a specialist form of the User Agent Server (UAS) defined in RFC 3261 and it will respond to a SIP INVITE request with a 3xx SIP response containing one or more SIP Contact headers containing the addresses of SBCs and associated individual interconnects ($C_1, C_2, \ldots C_n$) identified by trunk groups, to which the SIP INVITE should be sent, being determined by the information in that initial INVITE and the routing policies stored in the Redirect Server (R1). Whilst the SIP Redirect Server (R1) and the Reachability Server (R2) are shown as single centralised entities, this is a logical representation where the physical deployment can be via a number of hosts with the systems data distributed between them so that they act as one system. The trunk group identifiers used in this example are assumed to be unique within the context of network N1. Where SIP requests and responses are given below as examples, only the SIP method and relevant SIP headers are shown for brevity.

A session establishment will now be described in relation to the message chart of FIG. 6.

Monitoring the Status of Edge Devices and their Associated Interconnects

Step 1) When the SBCs are brought into service they are pre-configured with the SIP URI of the Reachability Server (R2) instead of the SIP Redirect Server (R1).

Step 2) Each SBC (S1 to $S_n$) starts to send period SIP OPTIONS requests to the Reachability Server (R2) every T1 seconds ($i_2$ to $I_n$). This OPTIONS request has the SIP URI of the SBC and includes a report on the interconnects with other networks (N1, N2, . . . $N_n$) that are in service. This can be via the SIP trunk group defined in RFC 4904.

e.g. SBC4 would send the following to the Reachability Server (R2) to indicate that it was in service itself and that interconnects $C_6$, $C_7$ and $C_8$ were also in service.

OPTIONS sip:R2.N1.net SIP/2.0
To: R2.N1.net
From: S4.N1.net;tag=34
Contact: <sip:S4.N1.net;grp=C6;trunk-context=N1.net>
Contact: <sip:S4.N1.net;grp=C7;trunk-context=N1.net>
Contact: <sip:S4.N1.net;grp=C8;trunk-context=N1.net>

Step 3) When the Reachability Server (R2) receives an OPTIONS request from any of the SBCs (S1 . . . Sn) it acknowledges it with a SIP '200 OK' response and builds a status table of the SBC URIs in service along with their associated interconnects identified by the inclusion of their trunk group identities in the OPTIONS request.

Step 4) The Reachability Server (R2) runs a timer of T2 seconds, where T2>T1 against each SBC address that is populated in its status table. If an OPTIONS request is received from an SBC that is already recorded in its status table, the associated timer is reset to expire after T2 seconds. In addition to the SBC address, the Reachability Server (R2) would also maintain the status of the associated interconnects' routes connected to it by the trunk group identifiers in the Contact headers in the OPTIONS request. If a new trunk group id is present it is added to the status table against the SBC and if a previously recorded trunk group is now absent from the OPTIONS request it is removed from the status table.

Session Establishment when all Components are in-Service and Reachable.

Step 5) A new call request is received from a Source Network (N2) on interconnect ($C_1$) at SBC (S1) as a SIP INVITE request.

INVITE sip:+16305550100@S1.N1.net;user=phone SIP/2.0
To: sip:+16305550100@S1.N1.net;user=phone
...
Contact: <sip:source@N2.net; user=phone>
...

Step 6) SBC (S1) sends a modified INVITE request with the trunk group identifier of the interconnect ($C_1$) to the Reachability Server (R2) using the same SIP URI as that used for the periodic OPTIONS requests ($i_2$).

INVITE sip:+16305550100@R2.N1.net;user=phone SIP/2.0
To: sip:+16305550100@R2.N1.net;user=phone
...
Contact: <sip:source@S1.N1.net;tgrp=C1;
    trunk-context=N1.net;user=phone>
...

Step 7) Reachability Server (R2) proxies the INVITE request to the Redirect Server (R1) but demands that responses must be returned via its self by adding a SIP Record-Route header ($i_1$). N.B. The Reachability Server may optionally use the information in the INVITE to refresh its internal Status Table.

INVITE sip:+16305550100@R1.N1.net;user=phone SIP/2.0
To: sip:+16305550100@R2.N1.net;user=phone
...
Record-Route: <sip:R2.N1.net;lr>
Contact: <sip:source@S1.N1.net;tgrp=C1;
    trunk-context=N1.net;user=phone>
...

Step 8) The Redirect Server (R1) determines that the end user address +441277326000 is served by Destination Network (N4) and would prefer to connect directly via interconnects $C_3$; $C_5$ or $C_7$ or, if these are unavailable, via interconnects $C_8$ or $C_9$ via the Transit Network N5. The Redirect Server (R1) therefore constructs a SIP 300 (Multiple Choices) response and sends it to the Reachability Server (R2) with a 'priority ordered' list of destination SBC addresses and associated trunk group identifiers for these interconnection routes which are contained in SIP Contact Headers.

300 (Multiple Choices)
Contact: <sip:+16305550100@S2.N1.net;tgrp=C3;
    trunk-context=N1.net;user=phone>
Contact: <sip:+16305550100@S3.N1.net;tgrp=C5;
    trunk-context=N1.net;user=phone>
Contact: <sip:+16305550100@S4.N1.net;tgrp=C7;
    trunk-context=N1.net;user=phone>
Contact: <sip:+16305550100@S4.N1.net;tgrp=C8;
    trunk-context=N1.net;user=phone>
Contact: <sip:+16305550100@S5.N1.net;tgrp=C9;
    trunk-context=N1.net;user=phone>

Step 9) The Reachability Server (R2) checks that the target SBCs and Trunk Groups in all the SIP Redirect Contact headers against the reachability status it maintains from the periodic OPTIONS requests as described in previous steps 1 to 4. If all SBCs (S2, S3, S4 & S5) and their associated interconnects as indicated by the trunk group identities (C3, C5, C7, C8 & C9) are in service, the SIP Redirect response is returned to the requesting SBC (S1) with the list of Contact headers unaltered thus:—

300 (Multiple Choices)
Contact: <sip:+16305550100@S2.N1.net;tgrp=C3;
    trunk-context=N1.net;user=phone>
Contact: <sip:+16305550100@S3.N1.net;tgrp=C5;
    trunk-context=N1.net;user=phone>
Contact: <sip:+16305550100@S4.N1.net;tgrp=C7;
    trunk-context=N1.net;user=phone>
Contact: <sip:+16305550100@S4.N1.net;tgrp=C8;
    trunk-context=N1.net;user=phone>
Contact: <sip:+16305550100@S5.N1.net;tgrp=C9;
    trunk-context=N1.net;user=phone>

Step 10) On receipt of the SIP 300 redirect response from the Reachability Server (R2), SBC (S1) attempts to set up the session to the first Contact in the list.

```
INVITE sip:+16305550100@S2.N1.net;tgrp=C3;
    trunk-context=N1.net;user=phone SIP/2.0
To: sip:+16305550100@S2.N1.net;tgrp=C3;
    trunk-context=N1.net;user=phone
...
Contact: <sip:source@S1.N1.net;tgrp=C1;
    trunk-context=N1.net;user=phone>
...
```

If this is rejected, for example due to congestion, then SBC (S1) would attempt to set up a session via the next entry in the Contact list received from the Reachability Server (R2), in this example SBC (S3) and trunk group ($C_5$).

```
INVITE sip:+16305550100@S3.N1.net;tgrp=C5;
    trunk-context=N1.net;user=phone SIP/2.0
To: sip:+16305550100@S3.N1.net;tgrp=C5;
    trunk-context=N1.net;user=phone
...
Contact: <sip:souce@S1.N1.net;tgrp=C1;
    trunk-context=N1.net;user=phone>
...
```

If this was rejected the process is repeated until the session set-up succeeds or the list is exhausted and the call rejected back to the source network N2.

Session Establishment when not all Components are In-Service and Reachable.

Step 11) Same as Step 5 above
Step 12) Same as Step 6 above
Step 13) Same as Step 7 above
Step 14) Same as Step 8 above Step 15) The Reachability Server (R2) checks that the target SBCs and Trunk Groups in all the SIP Redirect Contact headers against the reachability status it maintains from the periodic OPTIONS requests as described in previous steps 1 to 4. In this example SBCs (S2) and (S3) have been taken out of service or have become faulty or isolated from the core of the network (N1) and their in-service status has expired due to a lack of OPTIONS requests and consequently they have been removed from the reachability status table. In addition SBC (S4) has detected (via a mechanism not described here) that its interconnect ($C_8$) to Transit Network (N5) is out of service. Therefore SBC (S4) has not included the trunk group ($C_8$) in its periodic OPTIONS requests and the Reachability Server (R2) has removed ($C_8$) from its in-service table. As a result, the Reachability Server modifies the Contact list received in the SIP 300 response from the SIP Redirect Server (R1) in Step 14, by removing all the SIP Contact headers that have SBCs or trunk groups that are not recognised as being in its in-service status table. The modified response is returned to the requesting SBC (S1) with the list of Contact headers altered thus:

```
300 (Multiple Choices)
Contact: <sip:+16305550100@S4.N1.net;tgrp=C7;
    trunk-context=N1.net;user=phone>
Contact: <sip:+16305550100@S5.N1.net;tgrp=C9;
    trunk-context=N1.net;user=phone>
```

Step 16) On receipt of the SIP 300 redirect response from the Reachability Server (R2), SBC (S1) attempts to set up the session to the first Contact is the list. In this example SBC (S4) and trunk group ($C_7$).

```
INVITE sip:+16305550100@S4.N1.net;tgrp=C7;
    trunk-context=N1.net;user=phone SIP/2.0
To: sip:+16305550100@S4.N1.net;tgrp=C7;
    trunk-context=N1.net;user=phone
...
Contact: <sip:souce@S1.N1.net;tgrp=C1;
    trunk-context=N1.net;user=phone>
...
```

If this is rejected, say due to congestion on interconnect $C_7$, then SBC (S1) would attempt to set up a session via the next in the Contact list received from the Reachability Server (R2), in this example SBC (S5) and trunk group ($C_9$).

```
INVITE sip:+16305550100@S5.N1.net;tgrp=C9;
    trunk-context=N1.net;user=phone SIP/2.0
To: sip:+16305550100@S5.N1.net;tgrp=C9;
    trunk-context=N1.net;user=phone
...
Contact: <sip:souce@S1.N1.net;tgrp=C1;
    trunk-context=N1.net;user=phone>
...
```

If this second INVITE was rejected, as the Contact list is exhausted, the session set-up is rejected back to the source network N1.

As a further example consider a caller in Hong Kong initiating a call to a telephone number in London. The originating trunk entity, i.e. Session Border Controller SBC or a combination of a Call Control Manager & Media Gateway, makes its routing choice for a terminating trunk entity by exploiting the central routing policy server. Since the central routing policy server filters or modifies the routing policies given to the originating trunk entity in dependence on the availability of possible terminating trunks, no attempt would be made to establish a call to a terminating trunk or trunk entity that was not reachable. For example, a call to telephone number +4420XXXXXXXX into the SBC in Hong Kong could be directed by the centralised routing policy server to route the call to an SBC in London as a first choice followed by an SBC in Birmingham as a second choice. However, if the relevant trunk behind the London SBC, i.e. outside of the Hong Kong core IP network, is out of service or the London SBC itself is in a management state of out of service whilst still connected to the internal IP network, the option to send the call to the London SBC would not be given to the originating Hong Kong SBC. The Hong Kong SBC would instead be directed to route the call to the Birmingham SBC as a first choice.

Exemplary embodiments of the invention are realised, at least in part, by executable computer program code which may be embodied in application program data provided by the program modules in the reachability server 18 and routing policy server 12. When such computer program code is loaded into the memory of each server for execution by the respective processor, it provides a computer program code structure which is capable of performing at least part of the methods in accordance with the above described exemplary embodiments of the invention.

Figure 6:
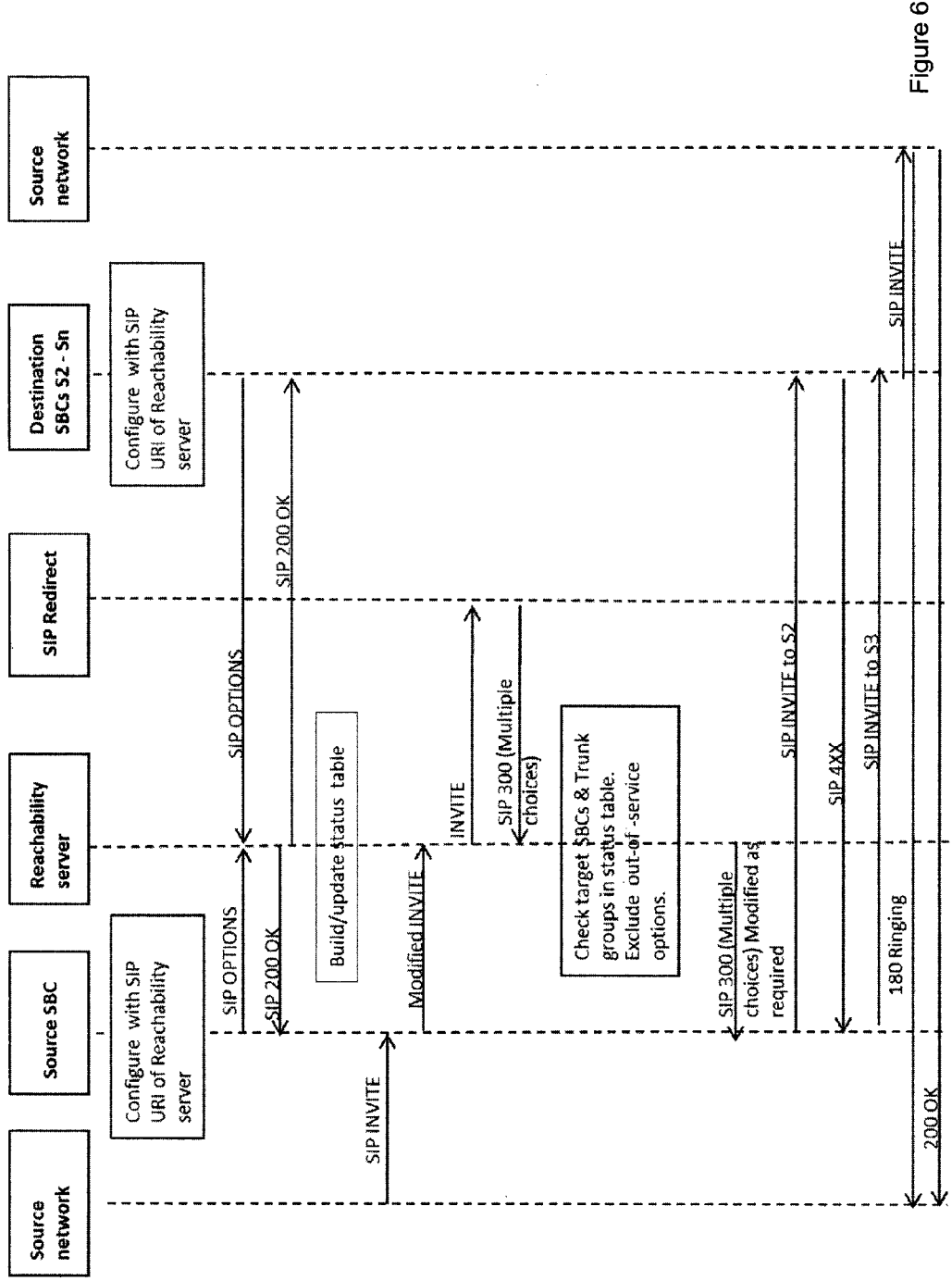
FIG. 6 is a message chart for the implementation in an IP Transit network using SIP signalling as shown in FIG. 4.

Furthermore, a person skilled in the art will appreciate that the computer program structure referred can correspond to the process flow shown in FIGS. 3 and 6 where each step of the processes can correspond to at least one line of computer program code and that such, in combination with the processor in respective server, provides apparatuses for effecting the described process.

The above embodiments are to be understood as illustrative examples of the invention. Further embodiments of the invention are envisaged. For example, the modules or part of the modules for effecting the described process can be implemented in hardware or a combination of hardware and software.

Further, the session routing policies stored in the server system could instead of being excluded by the selection module based on the status messages received from the session control edge nodes be modified or amended to avoid routing recommendations to failed destination session control edge nodes or their interconnects.

In summary, a method and apparatus for application layer session routing based on network element availability is provided. A centralised server system is arranged to monitor the abilities of session control edge nodes within a large VoIP and Multimedia transit network to handle session set-up requests. A status module in the server system receives status messages from the edge nodes and based on these messages a selection and modification module selects which edge nodes as well as which of their associated interconnects to other networks to include in a response to a routing request from a source node.

What is claimed is:

1. A method for controlling session setup between session control edge nodes, providing services to different service provider networks via interconnect connections, in a large scale VoIP transit network, said method comprising at a server system:
   storing application layer routing policies indicating which destination session control edge nodes in the VoIP transit network, and their associated interconnects, serve each respective destination network;
   receiving status messages from each session control edge node containing a service status of each of the connections with destination networks served by the session control edge node;
   receiving a routing request from one of said session control edge nodes;
   selecting one or more of said stored application layer routing policies to include in a response to the requesting session control edge node based on the service status reported in said received status messages; and
   sending the selected routing policies to the requesting session control edge node.

2. A method according to claim 1 wherein said status message received from each edge node is a SIP OPTIONS message for reporting the status of SIP trunk connections to downstream networks.

3. A method according to claim 1 further comprising excluding from selection any routing policies which rely on one or more connections to a downstream network connection controlled by one of the session control edge nodes and not included in the status messages from said edge node.

4. A method according to claim 3 further comprising reinstating a session control edge node and/or a connection as selectable options in a routing policy decision upon said session control edge node indicating the availability of the connection in a new status message.

5. A method according to claim 1 further comprising excluding from selection any routing policies which rely on a session control edge node which have failed to send one or more status messages to the server system.

6. A method according to claim 1 further comprising storing a reachability status table in the server system indicating the status of session control edge nodes and the status of their associated interconnects to other networks.

7. A non-transitory computer readable storage medium storing a computer program or a suite of computer programs, which upon execution by a computer processor, performs the method of claim 1.

8. A server system for controlling session setup between session control edge nodes, which interface to and provide services to different networks via interconnect connections, in a large scale VoIP transit network, said server system comprising:
   an interface arranged in operation to receive and to respond to routing requests from the session control edge nodes;
   a policy store arranged to store application layer routing policies indicating which destination session control edge nodes, and their associated interconnects, serve each respective destination network;
   a policy selection module arranged in operation to select one or more of said stored application layer routing policies in response to a session routing request received from one of said session control edge nodes;
   a session control edge node status module arranged in operation to receive status messages from each session control edge node containing a service status of each of the connections with destination networks served by the session control edge node;
   a store for storing said status messages;
   wherein said policy selection module is further arranged in operation to select the application layer routing policies to include in a response to the requesting edge node based on the service status reported in said received status messages.

9. A server system according to claim 8 in which the server system is arranged in operation to build a status table of the session control edge nodes in service along with the status of their associated interconnects to other networks.

10. A server system according to claim 9 where the server system is further arranged in operation to modify said status table in dependence on received status messages and/or due to the lack of status messages from one or more of the session control edge nodes.

11. A server system according to claim 8 in which the functionality of the server system is distributed in one or more routing policy servers and reachability servers communicating with each other via one or more management interfaces.

12. A server system according to claim 11 in which the reachability server is configured as a proxy server for the routing policy server.

13. A server system according to claim 8 in which the session control edge nodes are Session Border Controllers, Call Servers, Softswitches, Application Servers, Application Gateways or Media Gateways controllers.

14. A session control edge node of a first network that interfaces to one or more destination networks in a large scale application layer VoIP transit network, said edge node comprising a status message generating module arranged in operation to send status messages containing a service status of each of the connections with destination networks served by the session control edge node, to a session control edge node status module arranged in a centralised server system in the application layer network so that the centralised server system selects and sends one or more of application layer routing policies stored by the server system, the application layer routing policies indicating which destination session control edge nodes in the VoIP transit network, and their associated interconnects, serve each respective destination network.

* * * * *